United States Patent
Kim

(10) Patent No.: US 8,344,562 B2
(45) Date of Patent: Jan. 1, 2013

(54) FAN MOTOR APPARATUS FOR VACUUM CLEANER

(75) Inventor: Tak-Soo Kim, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 12/707,715

(22) Filed: Feb. 18, 2010

(65) Prior Publication Data

US 2010/0266388 A1    Oct. 21, 2010

(30) Foreign Application Priority Data

Apr. 21, 2009  (KR) .................. 10-2009-0034457

(51) Int. Cl.
*H02K 5/24* (2006.01)
(52) U.S. Cl. ...................... 310/51; 415/119; 15/326
(58) Field of Classification Search .............. 310/51; 415/119; 15/326; *H02K 5/24*
See application file for complete search history.

(56) References Cited

U.S. PATENT DOCUMENTS

| | | | | |
|---|---|---|---|---|
| 2,089,601 A | * | 8/1937 | Faber ........................... | 415/119 |
| 4,015,683 A | | 4/1977 | Williams et al. | |
| 4,864,683 A | * | 9/1989 | Herron et al. .................. | 15/412 |
| 5,110,266 A | * | 5/1992 | Toyoshima et al. ............ | 417/312 |
| 5,159,738 A | * | 11/1992 | Sunagawa et al. .............. | 15/326 |
| 5,293,664 A | * | 3/1994 | Lim et al. ........................ | 15/326 |
| 5,894,629 A | * | 4/1999 | Kim ................................. | 15/326 |
| 6,070,289 A | * | 6/2000 | Lee et al. ....................... | 15/326 |
| 6,611,989 B2 | * | 9/2003 | Oh et al. ......................... | 15/323 |
| 7,610,654 B2 | * | 11/2009 | Lee et al. ........................ | 15/353 |
| 2010/0266388 A1 | * | 10/2010 | Kim ............................... | 415/119 |

FOREIGN PATENT DOCUMENTS

| | | |
|---|---|---|
| EP | 0 453 296 A1 | 10/1991 |
| EP | 0 453 296 B1 | 11/1994 |
| KR | 1997-020001 | 5/1997 |
| KR | 1997-020002 | 5/1997 |
| KR | 1999-0026206 | 4/1999 |

OTHER PUBLICATIONS

Russian Office Action issued on May 20, 2011, in corresponding Russian Application No. 2010110167 (5 pages including English translation).

* cited by examiner

*Primary Examiner* — John K Kim
(74) *Attorney, Agent, or Firm* — NSIP Law

(57) ABSTRACT

A fan motor apparatus for a vacuum cleaner is provided. The fan motor apparatus may include a fan motor, an outer casing surrounding at least a part of the fan motor, wherein the outer casing includes a discharge portion having a discharge port; and, a noise-absorbent member is supported by the discharge port such that the port is closed, wherein the noise-absorbent member changes its shape to form a leakage space when internal exhaust pressure of the fan motor exceeds a predetermined degree.

5 Claims, 5 Drawing Sheets

FAN MOTOR APPARATUS FOR VACUUM CLEANER

CROSS-REFERENCE TO RELATED APPLICATION(S)

This application claims the benefit under 35 U.S.C. §119 (a) of a Korean Patent Application No. 10-2009-0034457, filed on Apr. 21, 2009, in the Korean Intellectual Property Office, the entire disclosure of which is incorporated herein by reference for all purposes.

BACKGROUND

1. Field

The following description relates to a vacuum cleaner, and more particularly, to a fan motor apparatus for a vacuum cleaner, which is adapted for use in a domestic, industrial, or commercial vacuum cleaner.

2. Description of the Related Art

A vacuum cleaner may generally employ a fan motor apparatus to forcibly draw in an external air stream from which foreign matter, such as dusts, may be removed.

The fan motor apparatus may include a plurality of vanes formed on a motor shaft, which may rotate to generate suction force as the motor starts driving. The generated suction force draws in the external air stream and dusts from the surface being cleaned into a centrifugal separator. Additionally, the generated suction force of the fan motor apparatus causes the drawn air in the centrifugal separator to rotate and shed foreign matters. A cleaned airstream, from which dust has been removed, is then discharged out. At this time, the fan motor apparatus and the drawn air stream generate noise. This is the main cause of the noise generally occurring in a vacuum cleaner.

Accordingly, various kinds of fan motor apparatuses and sealing members have been suggested in an attempt to reduce noise of the fan motor apparatus.

By way of example, Korean Registered Patent No. 10-0133743 entitled 'Cleaner having a rear noise insulating cover', Korean Registered Patent No. 10-0133744 entitled 'Noise-absorbing chamber of a vacuum cleaner having a spiral tube', Korean Registered Patent No. 10-0233513 entitled 'Motor mounting structure of vacuum cleaner', U.S. Pat. No. 5,159,738 entitled 'Vacuum cleaner having silence mechanism', and European Patent No. EP 453296 entitled 'Vacuum cleaner' pertain to such examples of a fan motor apparatus.

The above-mentioned examples suggest a dual casing to extend a discharge passage of a fan motor to reduce noise of a fan motor apparatus, and a noise-absorbent member arranged inside the dual casing, without being exposed, and fixed by adhesives or the like to prevent dislocation or deformation thereof.

Although the noise-absorbent members of the above examples may be able to reduce noise by absorbing the discharging air noise, problems may arise as minute foreign matters left unfiltered in the air stream may become caught within the noise-absorbent member and accumulated as the air stream is continuously discharged. That is, the foreign matters, once trapped in the noise-absorbent member, may deteriorate the air discharging and silencing efficiency. Therefore, it is necessary to clean or replace the noise-absorbent member periodically.

However, according to the above examples, the noise-absorbent members are arranged inside the dual casing without being exposed, making replacement or cleaning job difficult.

Due to uneasy access to the noise-absorbent member, the noise-absorbent members are often left with foreign matters caught therein, so the air discharging efficiency gradually deteriorates. However, the noise-absorbent member, when left unattended with the deteriorating discharging efficiency, mainly causes internal exhaust pressure of the fan motor apparatus to rise. The increase of internal exhaust pressure of the fan motor apparatus may cause a motor to operate under overload, make bigger noise, and possibly become overheated, thereby damaging the motor.

Further, the examples above generally employ dual casing structure to extend passage of discharged air stream, thereby complicating the structure of a fan motor apparatus, and also requiring an increased number of parts. Due to the complicated structure and need for an increased number of parts of a fan motor apparatus, fabrication of a vacuum cleaner may be difficult, manufacture cost may increase, and productivity may deteriorate.

Further yet, due to increased number of parts and complicated structure, a fan motor apparatus may have a limited compactness, and as a result, an apparatus, such as a vacuum cleaner employing the fan motor apparatus, may also be difficult to make compact.

Further, the limited compactness of a vacuum cleaner may also cause inconvenience to a user, who has to operate a large-sized vacuum cleaner.

SUMMARY

The following description relates to a fan motor apparatus for a vacuum cleaner. The fan motor apparatus includes a fan motor, an outer casing surrounding at least a part of the fan motor, wherein the outer casing includes a discharge portion having a discharge port, and a noise-absorbent member supported by the discharge port such that the discharge port is closed, wherein the noise-absorbent member changes its shape to form a leakage space when an internal exhaust pressure of the fan motor exceeds a predetermined degree.

The discharge portion may include a side frame to form the discharge port and configured to support the noise-absorbent member.

The side frame may include at least one recessed portion extending downwardly from an upper portion.

The side frame may further include a support portion protruding from a lower inner portion of the side frame configured to support a lower surface of the noise-absorbent member.

The discharge portion may further include at least one upper frame configured to support an upper surface of the noise-absorbent member on an upper portion of the side frame.

The noise-absorbent member may be returned to an original shape if the internal exhaust pressure of the fan motor is returned to a degree less than the predetermined degree.

The noise-absorbent member may be made from a foamed member having an elastic resilience.

In another aspect, there is provided a fan motor apparatus comprising a motor including a motor casing having a plurality of motor discharge ports formed therein, the motor configured to draw in an external air stream through an inlet and discharge the airstream through the motor discharge ports, an outer casing including an open upper portion configured to receive and surround at least a portion of the motor casing and a discharge portion including a plurality of discharge ports, and a noise-absorbent member positioned between the motor and the casing and surrounding a portion of the motor casing. The noise-absorbent member may be supported at least by a side frame of the discharge portion.

The noise-absorbent member may be air permeable and positioned such that it blocks the discharge ports.

The drawn in external air stream discharged from the motor discharge ports may be discharged from the discharge ports of the casing through the noise-absorbent member.

In response to an internal exhaust pressure of the fan motor exceeding a predetermined degree, the noise-absorbent member may be deformed to form a leakage space, thereby reducing the internal exhaust pressure of the fan motor.

In response to an internal exhaust pressure returning to a degree less than the predetermined degree, the noise-absorbent member may return to its original shape, thereby blocking the discharge port.

The motor may further include a brush portion and the casing may include a discharge passage pipe which receives the brush portion of the motor.

The fan motor apparatus may further include at least one support formed at a lower inner side of the side frame and configured to support a lower side of the noise-absorbent member.

The at least one support may be formed as at least one rib extending from a lower inner circumference of the side frame to a center of the discharge portion.

The fan motor apparatus may further include an upper frame extending from an upper portion of the side frame and is configured to support an upper edge of the noise-absorbent member.

The upper frame may be formed as at least one rib extending from the upper inner circumference of the side frame.

Other features and aspects will be apparent from the following detailed description, the drawings and the claims.

Figure 1:
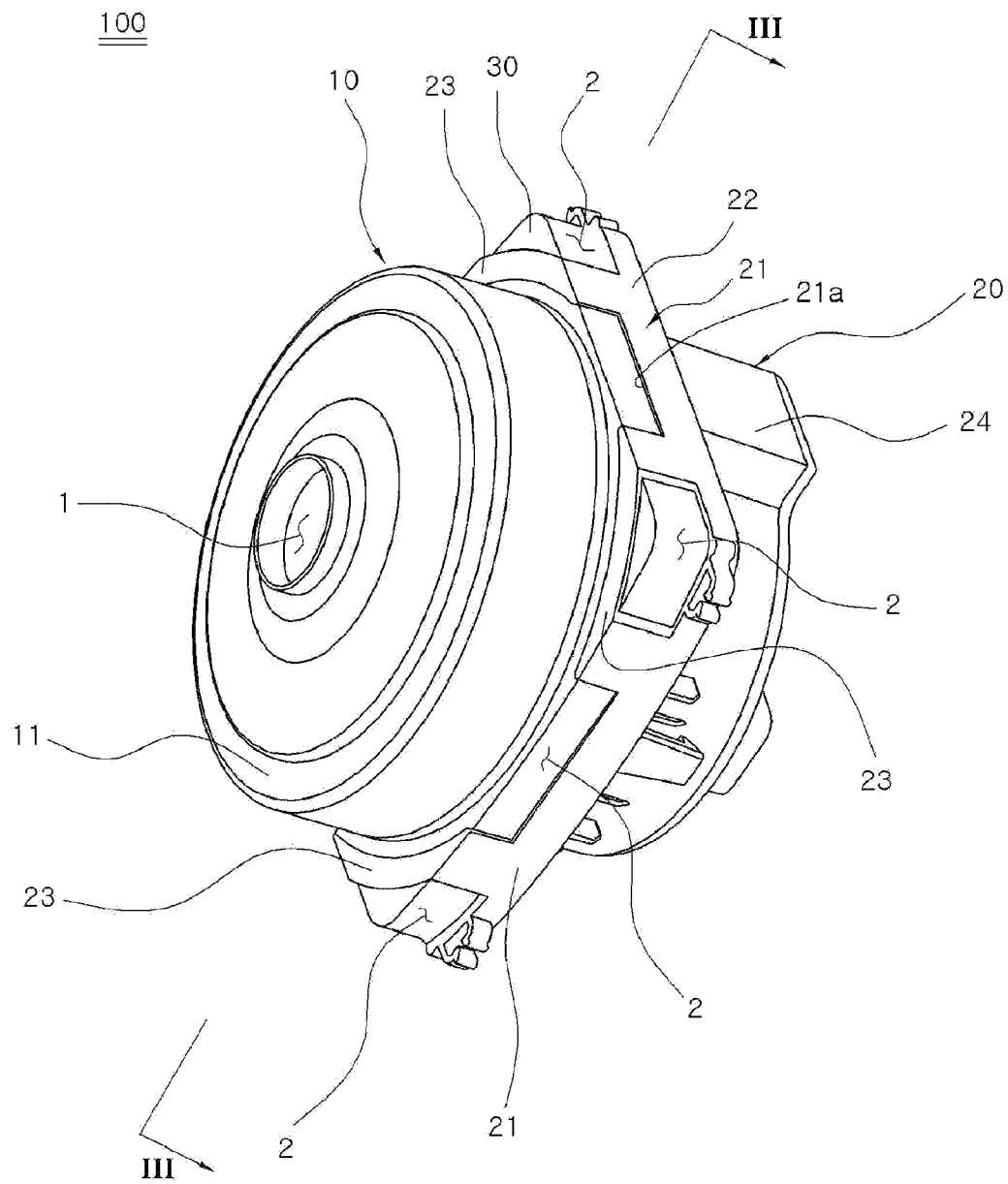
FIG. 1 shows a perspective view illustrating an example of a fan motor apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Figure 2:
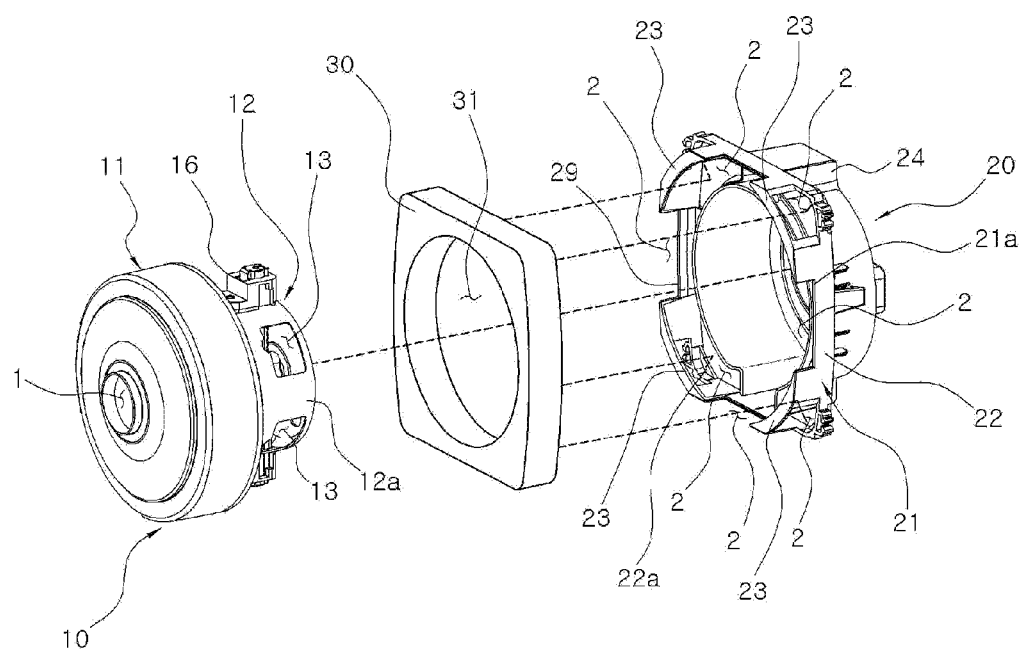
FIG. 2 shows an exploded perspective view illustrating the example of the fan motor apparatus of FIG. 1.
Figure 3:
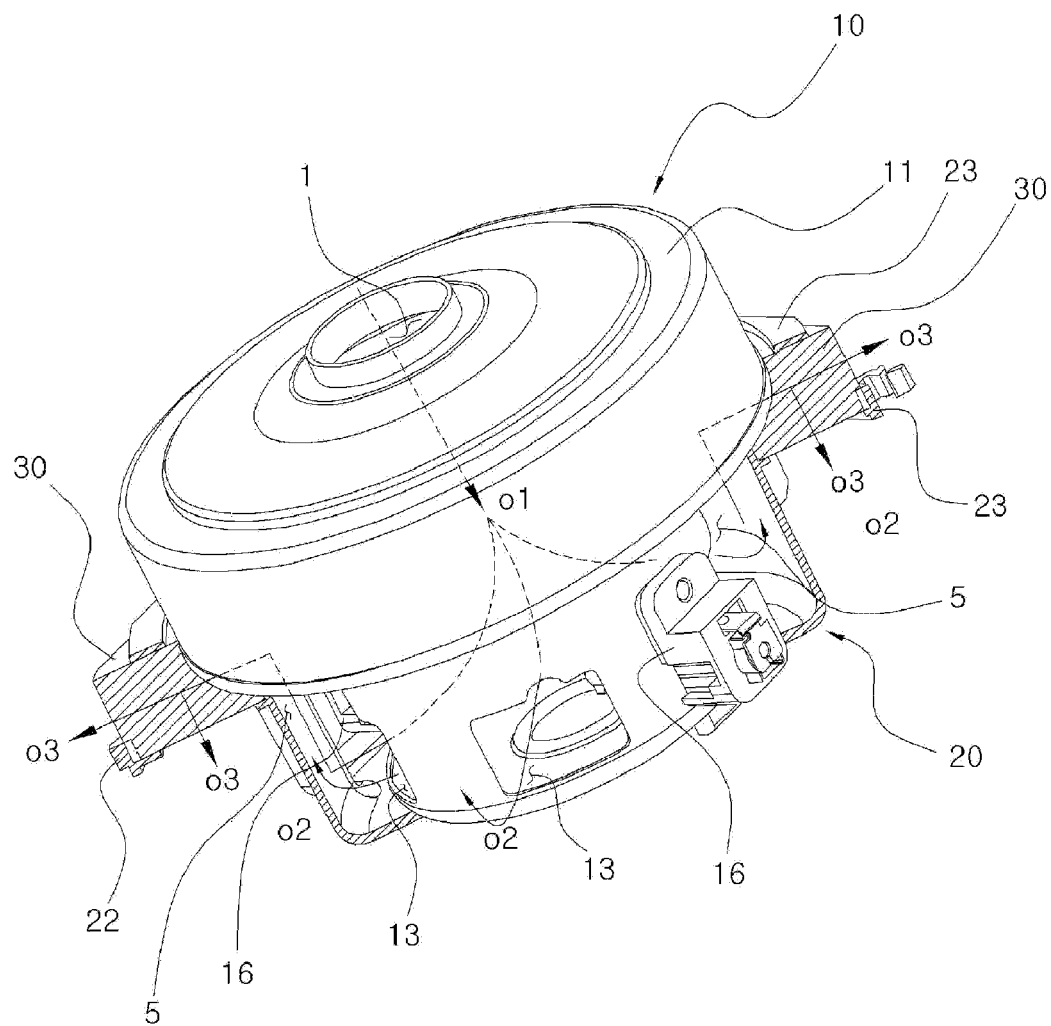
FIG. 3 shows a partial cross-section of the example of the fan motor apparatus taken on line III-III of FIG. 1, illustrating a noise-absorbent member connected to an outer casing.

FIG. 1 illustrates a perspective view showing an example of a fan motor apparatus. FIG. 2 illustrates an exploded perspective view of the example of a fan motor apparatus of FIG. 1. FIG. 3 illustrates a partial cross-section of an example of the fan motor apparatus taken on line III-III of FIG. 1, illustrating a noise-absorbent member is connected to an outer casing.

Referring to FIG. 1, an example of a fan motor apparatus 100 includes a fan motor 10, an outer casing 20, and a noise-absorbent member 30 inserted and supported in an area where the fan motor 10 and the outer casing 20 are connected to each other.

The fan motor 10 may have a structure in which an impeller unit 11 having an inlet 1 formed in the middle, is connected to an upper portion of the motor 12. A plurality of motor discharge ports 13 may be formed on a portion of the motor casing 12a that forms an outer portion of the motor 12. The motor casing 12a may also enclose therein general components of the motor, which may include an end through which a carbon contact portion of a brush 16 is exposed, a stator, a rotor, a commutator, and a motor shaft.

In the example of the fan motor 10 with the above-mentioned structure, a vane connected to the motor shaft arranged inside the impeller unit 11 rotates as the motor 12 starts driving, thereby drawing in an external air stream into the motor 12 through the inlet 1. The drawn in air stream is then discharged out through the motor discharge ports 13.

The outer casing 20 may surround the fan motor and include a discharge portion 21, discharge passage pipes 24, and a motor securing protrusion (not illustrated). The outer casing 20 may have an open upper portion and a closed lower portion.

The discharge portion 21 may include a side frame 22 to support the noise-absorbent member 30 on an outer circumference of the open portion of the outer casing 20, a plurality of supports 22a, a plurality of upper frames 23, and discharge ports 2.

A lower portion of the side frame 22 may be connected to form a plurality of discharge ports 2 in cooperation with the outer circumference of the open portion of the outer casing 20, and may support the side of the noise-absorbent member 30. Although the side frame 22 is illustrated as square tubes in FIGS. 1 to 5, the side frame 22 may take other forms such as cylinder or appropriate polygon, for example.

A plurality of recessed portions 21a may be formed from the upper portion of the side frame 22 down to a predetermined depth to extend the area of the discharge ports 2 and to thus facilitate the exhaustion of air. The supports 22a, which may be shelf-shaped, for example, may be formed on a lower inner side of the side frame 22 to support the lower side of the noise-absorbent member 30.

The upper frames 23 may be extended from the upper portion of the side frame 22 to the center of the discharge portion 21, to support an upper edge of the noise-absorbent member 30 where the noise-absorbent member 30 is connected to the discharge portion 21.

The areas where the noise-absorbent member 30 is exposed outside in the discharge port 21 are the discharge ports 2 of the outer casing 20 to discharge air stream.

In an alternative example, the side frame 22 may be formed as a cylindrical tube having a diameter larger than that of the open upper portion of the outer casing 20, and be connected to the outer circumference of the open upper portion of the outer casing 20 with a predetermined lower portion thereof. However, the configuration of the side frame 22 is not limited to the examples described above.

Further, instead of being formed in a shelf-shape, the supports 22a may be formed as a rib which may be integrally extended from the entirety of a lower inner circumference of the side frame 22 to the center of the discharge portion 21. Alternatively, the supports 22a may be formed as a plurality of ribs separately extended from the lower inner circumference of the side frame 22 to the center of the discharge portion 21.

Likewise, the upper frames 23 may also be formed as a rib which may be integrally extended from the entirety of the upper inner circumference of the side frame 22, or as a plurality of ribs separately extended from the upper inner circumference of the side frame 22 to the center of the discharge portion 21.

If the fan motor 10 is connected to the outer casing 20, the discharge passage pipes 24 help the brush 16 to be inserted smoothly, and also facilitate the moving of air streams, which are discharged through a motor discharge port 13 formed in a lower portion of the motor 12, to the discharge portion 21 of the outer casing 20.

The noise-absorbent member 30 may have an outer shape to correspond to that of an inner area of the discharge portion 21, and may also include a motor coupling hole 31 formed in the center to receive the motor 12. The noise-absorbent member 30 may be formed from a resilient member having a predetermined level of air permeability for air exhaustion, deformability by pressure, and recoverability to original shape on cessation of pressure application. The resilient member may include polyurethane foam, for example, which may be made from polyurethane by foaming and expansion molding. However, the material and method of forming the noise-absorbent member are not limited to these examples, as other suitable materials and manufacturing methods may be used as well.

In the structure explained above, the noise-absorbent member 30 may be inserted in the discharge portion 21 of the outer casing 20 and supported therein. The noise-absorbent member 30 may be inserted in the discharge portion 21 unfixedly, that is, without requiring a separate fixing process such as bonding, gasket coupling, or the like. The outer side of the noise-absorbent member 30 may be supported on the side frame 22, the lower side may be supported on the supports 22a, and the upper portion may be supported on the lower side of the outer circumference of the impeller unit 11 and the upper frames 23. As a result, the noise-absorbent member 30 may be mounted or demounted easily.

The fan motor 10 may be connected to the outer casing 20 in a manner in which the motor 12 is inserted in the outer casing 20 through the motor coupling hole 31. At this time, since the brush 16 is placed in the discharge passage pipe 24, the brush 16 does not interfere with the fan motor 10 which is being inserted in the outer casing 20.

Once the fan motor 10 is connected to the outer casing 20, the fan motor 10 may be secured firmly to the outer casing 20 by a motor fixing protrusions (not illustrated), and thus assembled to the fan motor apparatus 100.

In the example of a fan motor apparatus 100 assembled as explained above, and with reference to FIG. 3, the fan motor 10 draws in external air stream into an internal space through the inlet 1. The drawn in air stream is moved along a discharge passage 5 formed between the motor casing 12a and the outer casing 20 through the motor discharge port 13, passed through the noise-absorbent member 30 connected to the discharge portion 21, and discharged through the plurality of discharge ports 2. In this case, the discharge passage pipe 24 of the outer casing 20 may facilitate the moving of the air stream discharged from the motor 12 to the discharge portion 21, and also help to decrease the exhaust pressure of the air stream.

With further reference to FIG. 3, an air stream (o1) is discharged from inside the impeller unit 11 to inside the motor 12, another air stream (o2) is discharged to the discharge passage 5 through the motor discharge port 13, and yet another air stream (o3) is discharged through the discharge ports 2.

An example of the noise-reducing operation of the fan motor apparatus 100 with the above-mentioned structure is explained below.

For the purpose of noise reduction, the outer casing 20 may be connected to the fan motor 10 in a manner of surrounding the outer portion of the motor 12. In this way, the outer casing 20 may insulate the noise generated from the motor 12 from outside.

The discharge passage tube 24 may increase the volume of the air stream discharged through the motor 12 so as to decrease the pressure, and subsequently decrease air velocity and noise generated from the air flow.

The noise-absorbent member 30 may reduce noise generated from the fan motor apparatus 100 by blocking the discharge ports 2 of the discharge portion 21. That is, the noise-absorbent member 30 may absorb noise from the motor 12, block noise leaking out of the fan motor apparatus 100 through the discharge ports 2, and reduce velocity and also absorb noise of the air stream discharged through the discharge ports 2.

Meanwhile, the fan motor apparatus 100 may have an increase of internal exhaust pressure if minute foreign matters left unfiltered in the air stream are caught in the air holes of the noise-absorbent member 30, causing the air permeability of the noise-absorbent member 30 to deteriorate.

According to one aspect, the fan motor apparatus 100 may prevent internal exhaust pressure from rising, or reduce the likelihood that internal exhaust pressure will rise, above a predetermined level, since the noise-absorbent member 30 may deform and discharge the internal air of the fan motor apparatus 100, if internal exhaust pressure increases.

An example of the process of preventing or reducing the likelihood of the increase of internal exhaust pressure of the fan motor apparatus 100 by changing the shape of the noise-absorbent member 30 is explained below with reference to FIGS. 4 and 5.

Figure 4:
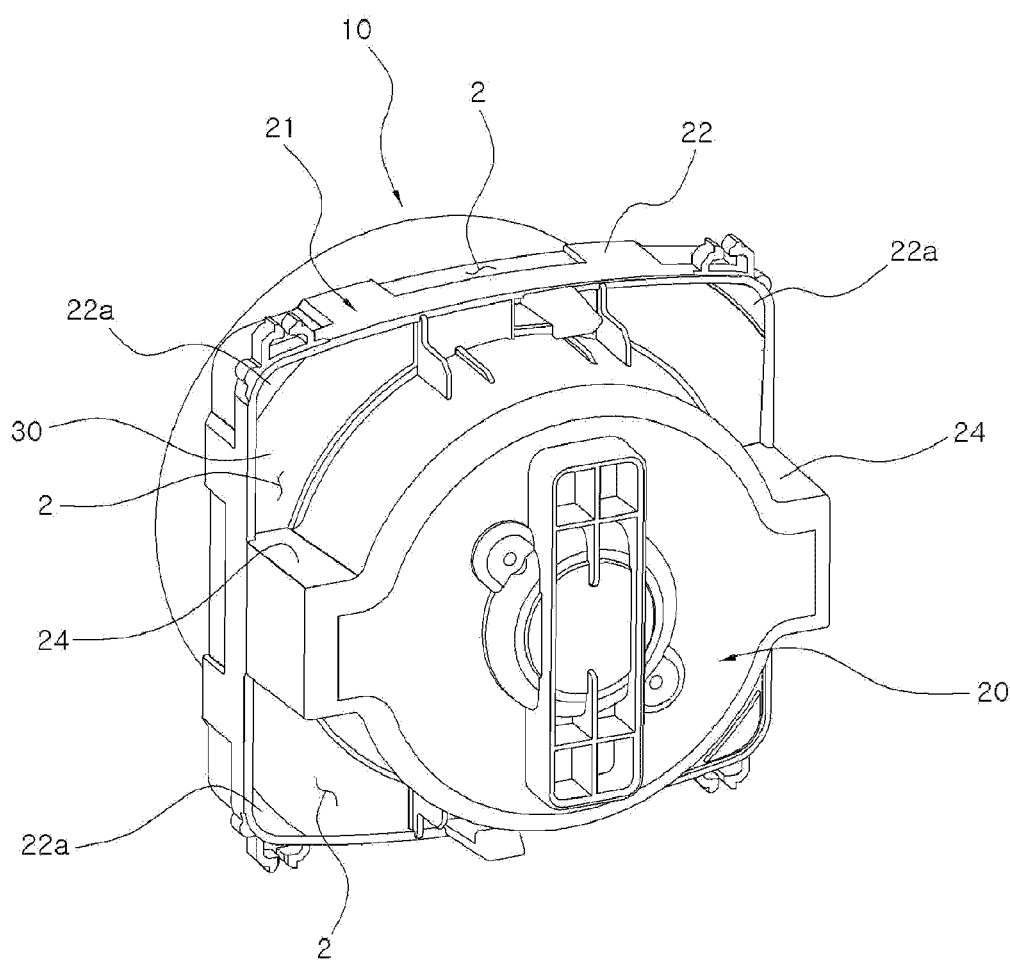
FIG. 4 shows a bottom perspective view of an example of the fan motor apparatus, illustrating a noise-absorbent member in normal state.

FIG. 4 illustrates a bottom perspective view of an example of a fan motor apparatus, illustrating a noise-absorbent member in normal state. FIG. 5 illustrates a bottom perspective view of an example of a fan motor apparatus, illustrating a noise-absorbent member in a deformed state due to increased internal exhaust pressure of the fan motor apparatus.

The fan motor apparatus 100 may perform normal air suction or discharge operation unless the noise-absorbent member 30 has degraded air permeability.

If the fan motor apparatus 100 is in normal operation state, the noise-absorbent member 30 does not change its shape as the internal air of the fan motor apparatus 100 is discharged through the noise-absorbent member 30. At this time, the noise-absorbent member 30 absorbs the noise generated from the motor 12 and the air stream.

As the fan motor apparatus 100 continues driving, fine particles of dusts may not be separated from the discharged air stream, but caught in the noise-absorbent member 30. As a result, the noise-absorbent member 30 may gradually have degraded air permeability. With the degraded air permeability, the noise-absorbent member 30 may not be able to pass air stream smoothly, in which case the fan motor apparatus 100 may have continuously increasing internal exhaust pressure. The increase of internal exhaust pressure of the fan motor apparatus 100 may cause overload of the motor 12 and keep the noise-absorbent member 30 under constant pressure.

However, in one example, since the noise-absorbent member 30 is connected and supported on the discharge portion 21, the noise-absorbent member 30 is capable of deforming easily. That is, the noise-absorbent member 30 may change its shape by the exhaust pressure, if exhaust pressure exerted to the noise-absorbent member 30 is above a predetermined degree.

Figure 5:
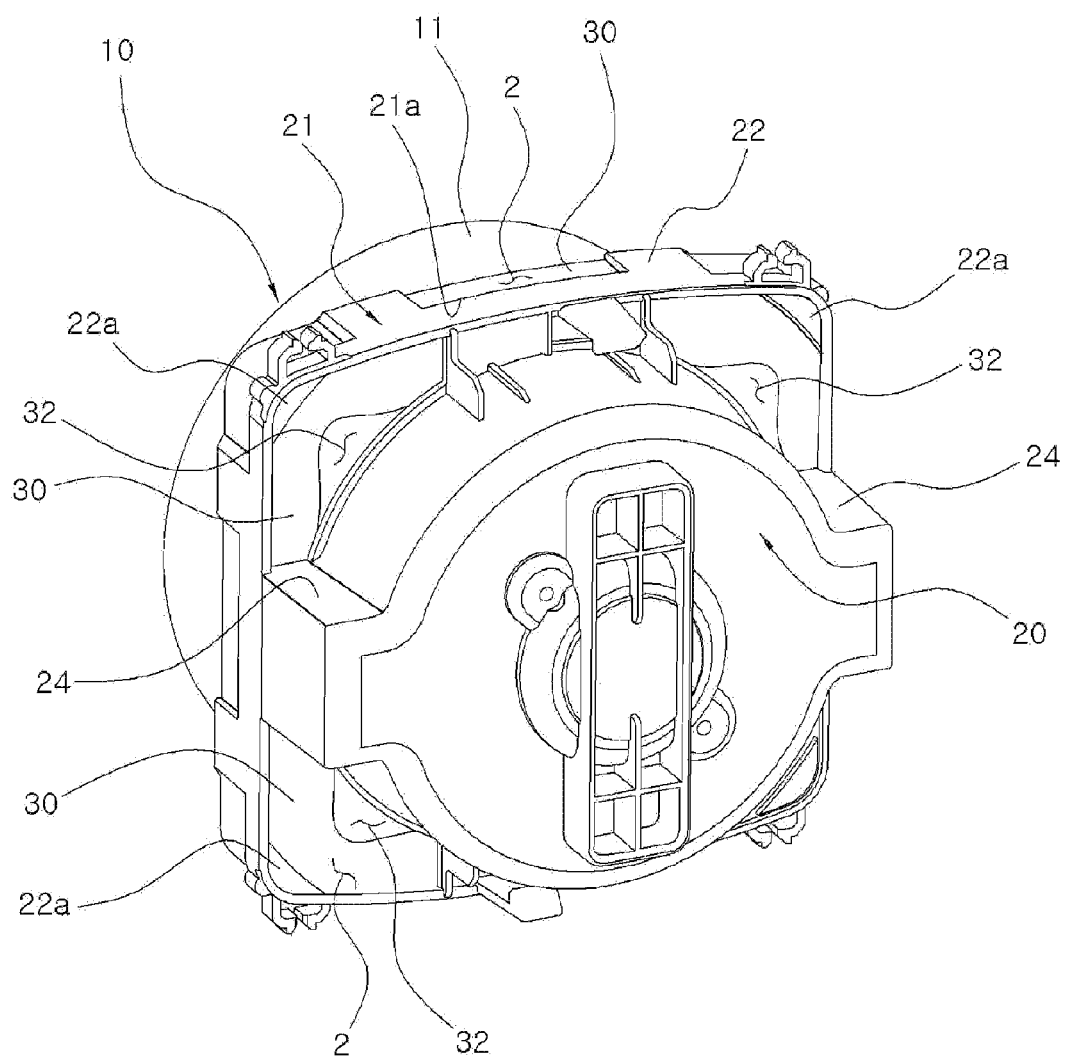
FIG. 5 shows a bottom perspective view of an example of a fan motor apparatus, illustrating a noise-absorbent member in deformed state due to increased internal exhaust pressure of the fan motor apparatus.

Referring to FIG. 5, for example, if the noise-absorbent member 30 changes its shape, a leakage space 32 may be formed in the discharge ports 2 so the internal air of the fan motor apparatus 100 may be discharged out rapidly. As a result, the internal exhaust pressure of the fan motor apparatus 100 may decrease.

If the fan motor apparatus 100 is returned to the normal internal exhaust pressure due to the leakage space 32, the noise-absorbent member 30 is returned to the original shape, closing the discharge ports 2 of the discharge portion 21.

As explained above, since the noise-absorbent member 30 is unfixedly supported on the discharge portion 21 in a manner in which the noise-absorbent member 30 is exposed outside, the noise-absorbent member 30 deforms if the internal exhaust pressure of the fan motor apparatus 100 is increased, thereby efficiently forming the leakage space 32. Accordingly, since the internal air of the fan motor apparatus 100 is discharged rapidly, the internal exhaust pressure of the fan motor apparatus 100 is prevented from rising to above a predetermined degree.

Further, since motor overload due to increase of internal exhaust pressure of the fan motor apparatus 100 is prevented or deterred, noise due to motor overload may be avoided.

Further, since motor overload is prevented or deterred, motor malfunction due to overload is prevented or deterred, and a vacuum cleaner may have an extended life span.

Further, since the noise-absorbent member 30 is unfixedly supported, and thus is capable of changing its shape, it may be easy to mount or demount the noise-absorbent member 30. Accordingly, even when the noise-absorbent member 30 is blocked due to foreign matters caught therein, it may be easy to replace or clean the noise-absorbent member 30. As a result, a vacuum cleaner may have improved ease of maintenance.

Further, since only one noise-absorbent member 30 and one outer casing 20 are required to reduce noise of the fan motor apparatus 100, the fan motor apparatus 100 may have a reduced number of components and simplified structure.

Further, since the number of components may be reduced and the structure is simplified, the fan motor apparatus 100 may have a reduced size, and accordingly, the vacuum cleaner employing the fan motor apparatus 100 may also have a reduced size.

Further, due to a reduced number of components and simplified structure, the fan motor apparatus 100 or the vacuum cleaner having the fan motor apparatus 100 may be fabricated efficiently with a reduced manufacture cost and increased productivity.

A number of examples of embodiments have been described above. Nevertheless, it will be understood that various modifications may be made. For example, suitable results may be achieved if the described techniques are performed in a different order and/or if components in a described system, architecture, device, apparatus or circuit are combined in a different manner and/or replaced or supplemented by other components or their equivalents. Accordingly, other implementations are within the scope of the following claims.

What is claimed is:

1. A fan motor apparatus for a vacuum cleaner, comprising:
a fan motor;
an outer casing surrounding at least a part of the fan motor, wherein the outer casing includes a discharge portion having a discharge port; and
a noise-absorbent member supported by the discharge port-portion such that the discharge port is closed when an internal exhaust pressure of the fan motor is below a predetermined degree, the noise-absorbent member changes its shape to form a leakage space when an internal exhaust pressure of the fan motor exceeds a predetermined degree, and wherein the discharge portion comprises a side frame formed on a side surface to support the noise-absorbent member, a support portion protruding from a lower inner portion of the side frame to support a lower surface of the noise-absorbent member, and at least one upper frame extending inward from the side frame to support an upper surface of the noise-absorbent member on an upper portion of the side frame.

2. The fan motor apparatus of claim 1, wherein the discharge port is formed at the side frame.

3. The fan motor apparatus of claim 2, wherein the side frame comprises at least one recessed portion extending downwardly from an upper portion.

4. The fan motor apparatus of claim 1, wherein the noise-absorbent member is returned to an original shape if the internal exhaust pressure of the fan motor is returned to a degree less than the predetermined degree.

5. The fan motor apparatus of claim 1, wherein the noise-absorbent member is made from a foamed member having an elastic resilience.

* * * * *